(12) United States Patent
Ersahin

(10) Patent No.: US 11,203,944 B2
(45) Date of Patent: Dec. 21, 2021

(54) FLARED FAN HUB SLOT

(71) Applicant: United Technologies Corporation, Farmington, CT (US)

(72) Inventor: Mehmet Akif Ersahin, South Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 25 days.

(21) Appl. No.: 16/561,843

(22) Filed: Sep. 5, 2019

(65) Prior Publication Data

US 2021/0071538 A1 Mar. 11, 2021

(51) Int. Cl.
*F01D 5/30* (2006.01)
*F01D 5/02* (2006.01)

(52) U.S. Cl.
CPC ............ *F01D 5/3007* (2013.01); *F01D 5/02* (2013.01); *F05D 2220/32* (2013.01); *F05D 2230/60* (2013.01); *F05D 2240/90* (2013.01)

(58) Field of Classification Search
CPC . F01D 5/02; F01D 5/30; F01D 5/3007; F05D 2220/32; F05D 2230/10; F05D 2240/90
See application file for complete search history.

(56) References Cited

U.S. PATENT DOCUMENTS

| | | | |
|---|---|---|---|
| 3,378,230 A | 4/1968 | Toomey | |
| 4,169,694 A | 10/1979 | Sanday | |
| 5,836,744 A * | 11/1998 | Zipps | F01D 5/147 416/193 A |
| 6,846,159 B2 * | 1/2005 | Zabawa | F01D 21/04 416/193 A |
| 7,690,896 B2 | 4/2010 | Stevens et al. | |
| 7,845,076 B2 * | 12/2010 | Beckford | H02K 3/487 29/889.1 |
| 9,341,068 B2 * | 5/2016 | Nagano | F01D 5/30 |

(Continued)

FOREIGN PATENT DOCUMENTS

| | | |
|---|---|---|
| EP | 2809578 A1 | 12/2014 |
| JP | 59113206 A | 6/1984 |
| WO | 2009100795 A1 | 8/2009 |

OTHER PUBLICATIONS

EP Search Report Application No.; 20194071; dated Feb. 10, 2021; p. 10.

*Primary Examiner* — Courtney D Heinle
*Assistant Examiner* — Danielle M. Christensen
(74) *Attorney, Agent, or Firm* — Cantor Colburn LLP

(57) ABSTRACT

An aerodynamic element assembly is provided and includes a hub defining a slot and an aerodynamic element. The aerodynamic element includes a dovetail section receivable in the slot and an airfoil section configured to aerodynamically interact with fluid to drive hub and aerodynamic element rotations around a rotational axis. The dovetail section is deformable during operational conditions from an initial configuration to a deformed configuration and, with the dovetail section assuming the initial configuration, at least one of ends of the slot are flared and thereby configured to be spaced apart from corresponding ends of the dovetail section and ends of the dovetail section are shaved and thereby configured to be spaced apart from corresponding ends of the dovetail section.

17 Claims, 4 Drawing Sheets

(56) References Cited

U.S. PATENT DOCUMENTS

| | | | |
|---|---|---|---|
| 9,810,077 B2* | 11/2017 | Murdock | F01D 5/3007 |
| 2009/0185910 A1* | 7/2009 | McLaughlan | F01D 5/3038 |
| | | | 416/223 R |
| 2014/0140852 A1 | 5/2014 | Bluck | |
| 2017/0241275 A1* | 8/2017 | Ahmad | F01D 5/3007 |

* cited by examiner

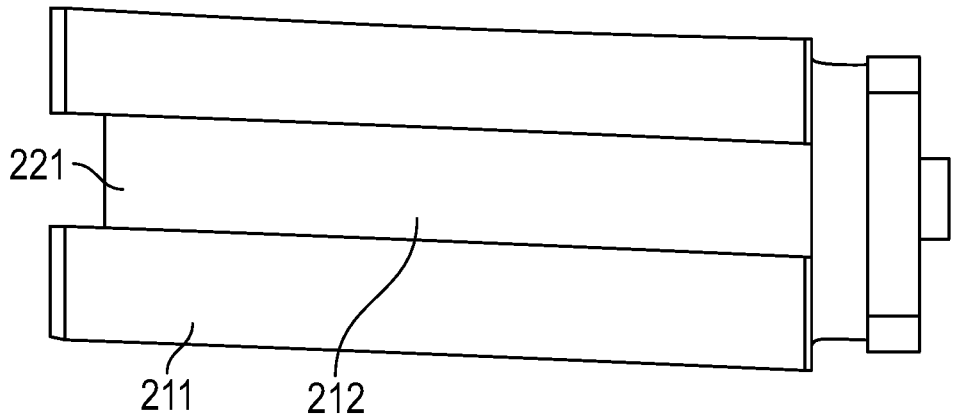

FIG. 7

Determining an extent of stress concentration between pressure surfaces of a dovetail section of an aerodynamic element and pressure surfaces of a slot defined in a hub At least one of flaring ends of the pressure surfaces of the slot outwardly and shaving ends of the pressure surfaces of the dovetail section inwardly in accordance with a determined extent of the stress concentrations

FIG. 8

FLARED FAN HUB SLOT

BACKGROUND

Exemplary embodiments of the present disclosure relate generally to gas turbine engines and, in one embodiment, to a flared fan hub slot and/or to a shaved blade dovetail and to gas turbine engines with a flared fan hub slot.

Airfoils are present in many aerodynamic applications including, but not limited to, turbines of gas turbine engines. These turbine airfoils each have a root, a tip, pressure and suction surfaces that extend from root to tip and leading and trailing edges at leading and trailing sides of the pressure and suction surfaces. In a turbine, the turbine airfoils can aerodynamically interact with high temperature and high pressure fluids to cause a rotor to rotate.

Turbine airfoils and other similar features are held in place within gas turbine engines by the root being provided with a dovetail shape (i.e., the blade dovetail) that fits within a complementarily shaped slot in a hub platform (i.e., the fan hub slot). During operations of the gas turbine engine, as the rotor rotates at increasingly higher speeds, the blade dovetail begins to mechanically deform due to centrifugal forces and to engage with pressure surfaces of the fan hub slot. It has been seen that these engagements are often provided such that the fan hub slot and the blade dovetail both experience stress concentrations at their respective ends due to higher loads being transferred at these locations.

Accordingly, a need exists for a blade dovetail or a fan hub slot that distributes loads and thus reduces stress concentrations.

BRIEF DESCRIPTION

According to an aspect of the invention, an aerodynamic element assembly is provided and includes a hub defining a slot and an aerodynamic element. The aerodynamic element includes a dovetail section receivable in the slot and an airfoil section configured to aerodynamically interact with fluid to drive hub and aerodynamic element rotations around a rotational axis. The dovetail section is deformable during operational conditions from an initial configuration to a deformed configuration and, with the dovetail section assuming the initial configuration, at least one of ends of the slot are flared and thereby configured to be spaced apart from corresponding ends of the dovetail section and ends of the dovetail section are shaved and thereby configured to be spaced apart from corresponding ends of the dovetail section These and other advantages and features will become more apparent from the following description taken in conjunction with the drawings.

In accordance with additional or alternative embodiments, the aerodynamic element includes a turbine blade and the hub includes a fan hub.

In accordance with additional or alternative embodiments, the aerodynamic element includes a blade and the hub includes a bladed disk.

In accordance with additional or alternative embodiments, the slot and the dovetail section are curved.

In accordance with additional or alternative embodiments, the slot and the dovetail section are straight.

In accordance with additional or alternative embodiments, a cross-sectional shape of the slot includes inwardly facing pressure surfaces and a cross-sectional shape of the dovetail section includes outwardly facing pressure surfaces.

In accordance with additional or alternative embodiments, with the dovetail section assuming the initial configuration, ends of each side of the slot at opposite ends thereof are flared outwardly and thereby configured to be spaced apart from corresponding ends of pressure surfaces of the dovetail section.

In accordance with additional or alternative embodiments, the ends of each side of the slot at the opposite ends thereof are flared outwardly by about 0.005 inches.

In accordance with additional or alternative embodiments, with the dovetail section assuming the initial configuration, ends of each side of the dovetail section at opposite ends thereof are shaved inwardly and thereby configured to be spaced apart from corresponding ends of pressure surfaces of the slot.

In accordance with additional or alternative embodiments, the ends of each side of the dovetail section at the opposite ends thereof are shaved inwardly by about 0.005 inches.

According to another aspect of the disclosure, a gas turbine engine is provided and includes a compressor section in which air is compressed, a combustor section in which compressed air is mixed with fuel and combusted to produce a working fluid and a turbine section in which the working fluid is expanded. At least one of the compressor section and the turbine section includes an aerodynamic element assembly. The aerodynamic assembly includes a hub defining a slot and an aerodynamic element. The aerodynamic element includes a dovetail section receivable in the slot and an airfoil section configured to aerodynamically interact with fluid to drive hub and aerodynamic element rotations around a rotational axis. The dovetail section is deformable during operational conditions from an initial configuration to a deformed configuration and, with the dovetail section assuming the initial configuration, at least one of ends of the slot are flared and thereby configured to be spaced apart from corresponding ends of the dovetail section and ends of the dovetail section are shaved and thereby configured to be spaced apart from corresponding ends of the dovetail section.

In accordance with additional or alternative embodiments, the aerodynamic element includes a turbine blade and the hub includes a fan hub of the turbine section.

In accordance with additional or alternative embodiments, the aerodynamic element includes a blade and the hub includes a bladed disk of the compressor section.

In accordance with additional or alternative embodiments, the slot and the dovetail section are curved or straight.

In accordance with additional or alternative embodiments, a cross-sectional shape of the slot includes inwardly facing pressure surfaces and a cross-sectional shape of the dovetail section includes outwardly facing pressure surfaces.

In accordance with additional or alternative embodiments, with the dovetail section assuming the initial configuration, ends of each side of the slot at opposite ends thereof are flared outwardly and thereby configured to be spaced apart from corresponding ends of pressure surfaces of the dovetail section.

In accordance with additional or alternative embodiments, the ends of each side of the slot at the opposite ends thereof are flared outwardly by about 0.005 inches.

In accordance with additional or alternative embodiments, with the dovetail section assuming the initial configuration, ends of each side of the dovetail section at opposite ends thereof are shaved inwardly and thereby configured to be spaced apart from corresponding ends of pressure surfaces of the slot.

In accordance with additional or alternative embodiments, the ends of each side of the dovetail section at the opposite ends thereof are shaved inwardly by about 0.005 inches.

According to another aspect of the disclosure, a method of assembling an aerodynamic element assembly of a gas turbine engine is provided. The method includes determining an extent of stress concentrations between pressure surfaces of a dovetail section of an aerodynamic element and pressure surfaces of a slot defined in a hub and at least one of flaring ends of the pressure surfaces of the slot outwardly and shaving ends of the pressure surfaces of the dovetail section inwardly in accordance with a determined extent of the stress concentrations.

BRIEF DESCRIPTION OF THE DRAWINGS

The following descriptions should not be considered limiting in any way. With reference to the accompanying drawings, like elements are numbered alike:

FIG. 7 is a radial view of an aerodynamic element assembly with a straight fan hub slot in accordance with embodiments; and FIG. 8 is a flow diagram illustrating a method of assembling an aerodynamic element assembly of a gas turbine engine in accordance with embodiments.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
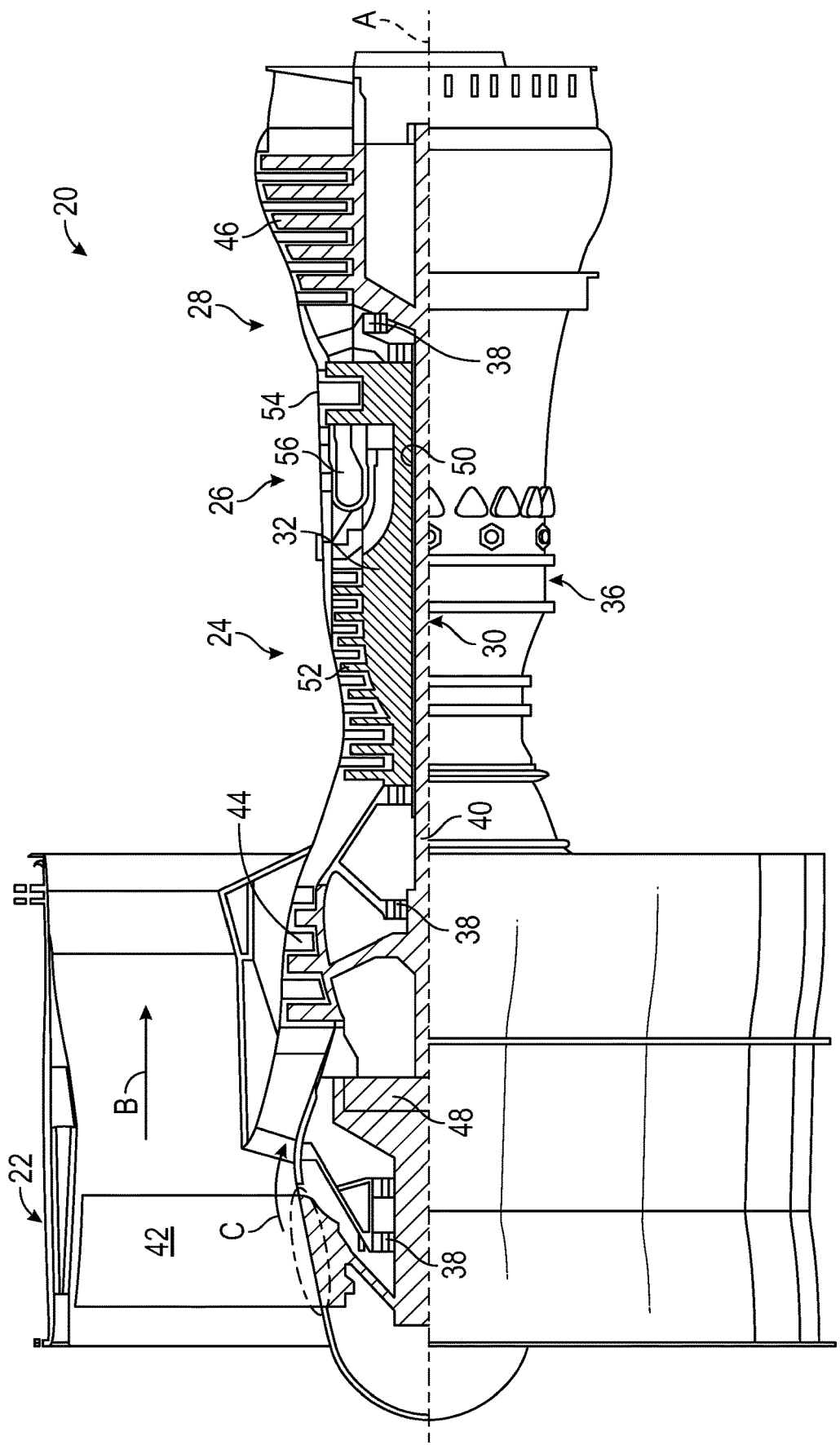
FIG. 1 is a partial cross-sectional view of a gas turbine engine.
Figure 2:
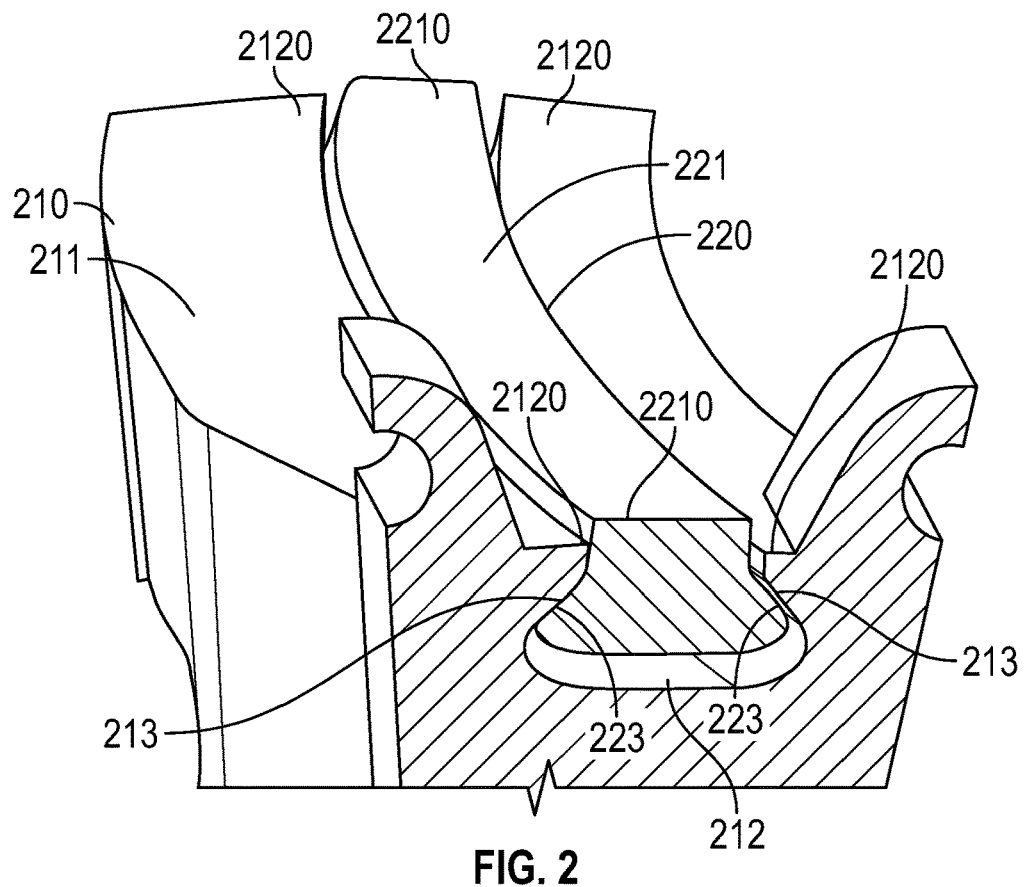
FIG. 2 is a perspective view of an aerodynamic element assembly in accordance with embodiments.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 m/sec).

As will be described below, stress concentrations at respective ends of fan hub slots and blade dovetails (and similar features of gas turbine engines, such as the gas turbine engine 20 of FIG. 1) are reduced by at least one of the ends of the fan hub slots being flared outwardly starting from a predefined distance from the ends and pressure surfaces of the ends of the blade dovetail being shaved starting from a predefined distance from the ends. Thus, when the respective ends of the fan hub slots and the blade dovetails start to engage as the blade dovetail deforms due to increasing rotational speed of the gas turbine engine, load transfer is distributed along extended lengths of the blade dovetails and stress concentrations at the respective ends are reduced.

With reference to FIGS. 2-5, an aerodynamic element assembly 201 is provided and includes a hub 210 and an aerodynamic element 220. The hub 210 includes a body 211 that is formed to define a slot 212. The slot 212 has a cross-sectional shape that includes radially inwardly facing pressure surfaces 213 on either side of the slot 212. The aerodynamic element 220 includes a dovetail section 221 and an airfoil section 222 (see FIG. 5). The dovetail section 221 is receivable in the slot 212 and includes radially outwardly facing pressure surfaces 223 on either side of the dovetail section 221 to register and engage with the pressure surfaces 213 of the slot 212. The airfoil section 222 extends radially from the dovetail section 221 and is configured to aerodynamically interact with a working fluid to drive rotations of the hub 210 and the aerodynamic element 220 around a rotational axis (i.e., the engine central longitudinal axis A of FIG. 1).

During operations of the aerodynamic element assembly 201, the dovetail section 221 is deformable from an initial configuration, in which the dovetail section assumes an undeformed condition, to a deformed configuration. With the dovetail section 221 assuming the initial configuration, at least one or both of ends 2120 (see FIG. 2) of the slot 212 are flared and ends 2210 (see FIG. 2) of the dovetail section 221 are shaved. That is, with the dovetail section 221 assuming the initial configuration and with the dovetail section 221 being received in the slot 212, ends 2120 of the pressure surfaces 213 of the slot 212 can be flared outwardly from corresponding portions of the pressure surfaces 223 of the dovetail section 221 so as to be spaced apart from the corresponding portions of the pressure surfaces 223 of the dovetail section 221. Conversely, with the dovetail section 221 assuming the initial configuration and with the dovetail section 221 being received in the slot 212, ends 2210 of the pressure surfaces 223 of the dovetail section 221 can be shaved inwardly from corresponding portions of the pressure surfaces 213 of the slot 212 so as to be spaced apart from the corresponding portions of the pressure surfaces 213 of the slot 212.

In addition, it is to be understood that, with the dovetail section 221 assuming the initial configuration and with the dovetail section 221 being received in the slot 212, the ends 2120 of the pressure surfaces 213 of the slot 212 and the ends 2210 of the pressure surfaces 223 of the dovetail section 221 can be flared outwardly and shaved inwardly, respectively, so as to be spaced apart from one another.

Figure 3:
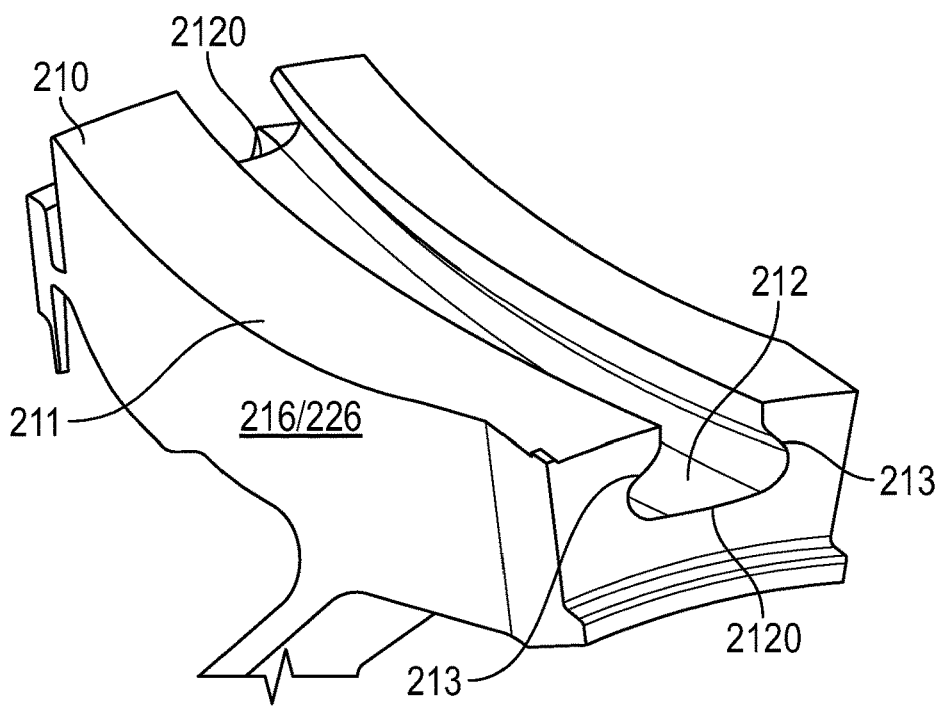
FIG. 3 is a perspective view of a fan hub of the aerodynamic assembly of FIG. 2.
Figure 4:
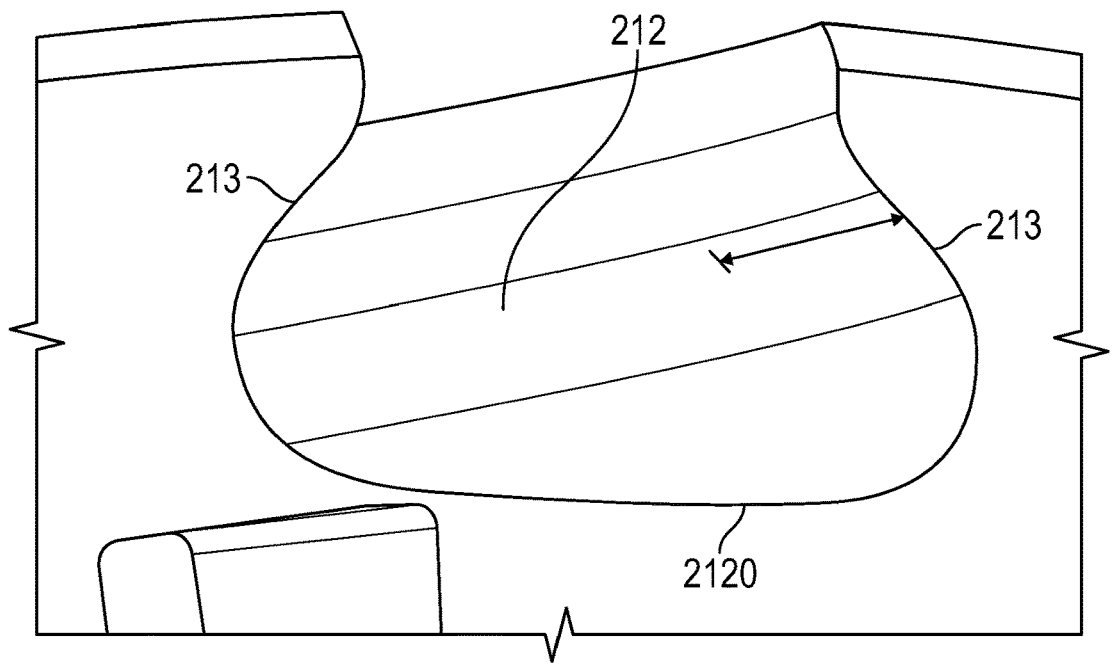
FIG. 4 is an enlarged perspective view of the fan hub of FIG. 3.
Figure 5:
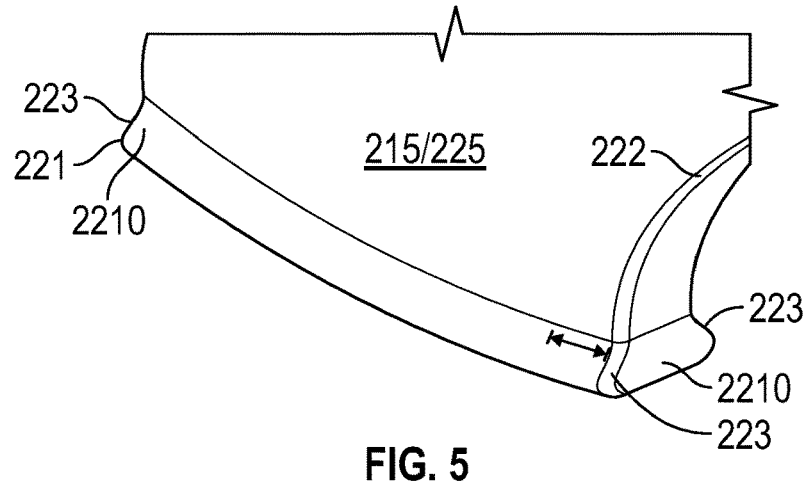
FIG. 5 is a perspective view of an aerodynamic element of the aerodynamic element assembly of FIG. 2.

In accordance with embodiments, the aerodynamic assembly 201 of FIGS. 2-5 can be provided at various locations throughout a gas turbine engine, such as a hub/dovetail interface of the gas turbine engine 20 of FIG. 1, which is circled in FIG. 1, as well as other types of engines. As such, as shown in FIGS. 3 and 5 in particular, the aerodynamic element 220 can include or be provided as a turbine blade 225 and the hub 210 can include or be provided as a fan hub 226 of the turbine section 28 (described above) and/or the aerodynamic element 220 can include or be provided as a blade 215 and the hub 210 can include or be provided as a bladed disk 216 of the compressor section 24 (described above).

Figure 6:
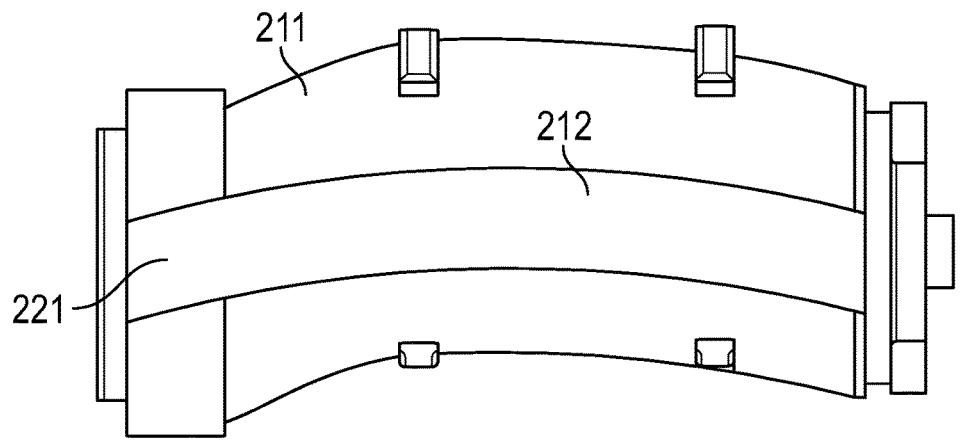
FIG. 6 is a radial view of an aerodynamic element assembly with a curved fan hub slot in accordance with embodiments.

In any case, with reference to FIGS. 6 and 7, both the slot 212 and the dovetail section 221 can be curved (see FIG. 6) or both the slot 212 and the dovetail section 221 can be straight (see FIG. 7).

For those cases in which the ends 2120 of the pressure surfaces 213 of the slot 212 are flared outwardly from the corresponding portions of the pressure surfaces 223 of the dovetail section 221, the ends 2120 of the pressure surfaces 213 at each side of the slot 212 at each of the opposite ends of the slot 212 can be flared outwardly by about 0.005 inches (machining tolerances are about 0.001 inches). The outward flaring extends from the opposite ends of the slot 212 inwardly by about 1 inch.

With this construction, with the dovetail section 221 assuming the initial configuration and with the dovetail section 221 being received in the slot 212, the ends 2120 of the pressure surfaces 213 at each side of the slot 212 and at the opposite ends of the slot 212 are at least initially spaced from the corresponding portions of the pressure surfaces 223 of the dovetail section 221. In the exemplary case of the aerodynamic element 220 including or being provided as the turbine blade 225 and the hub 210 including or being provided as the fan hub 215 of the turbine section 28, as the rotations of the hub 210 and the aerodynamic element 220 speed up, the dovetail section 221 mechanically deforms toward assuming the deformed condition. At this point, outward flared pressure surfaces 213 of the slot 212 register and engage with the complementary pressure surfaces 223 of the dovetail section 221 but the contact area between the pressure surfaces 213 and 223 is extended along lengths of the slot 212. In this way, transferred loads are distributed more evenly along the slot 212 and stress concentrations at the ends of the slot 212 are reduced.

For those cases in which the ends 2210 of the pressure surfaces 223 of the dovetail section 221 are shaved inwardly from the corresponding portions of the pressure surfaces 213 of the slot 212, the ends 2210 of the pressure surfaces 223 at each side of the dovetail section 221 at each of the opposite ends of the slot dovetail section 221 can be shaved inwardly by about 0.005 inches (machining tolerances are about 0.001 inches). The inward shaving extends from the opposite ends of the dovetail section 221 inwardly by about 1 inch.

With this construction, with the dovetail section 221 assuming the initial configuration and with the dovetail section 221 being received in the slot 212, the ends 2210 of the pressure surfaces 223 at each side of the dovetail section 221 and at the opposite ends of the dovetail section 221 are at least initially spaced from the corresponding portions of the pressure surfaces 213 of the slot 212. In the exemplary case of the aerodynamic element 220 including or being provided as the turbine blade 225 and the hub 210 including or being provided as the fan hub 215 of the turbine section 28, as the rotations of the hub 210 and the aerodynamic element 220 speed up, the dovetail section 221 mechanically deforms toward assuming the deformed condition. At this point, inward shaved pressure surfaces 223 of the dovetail section 221 register and engage with the complementary pressure surfaces 223 of the dovetail section 221 but the contact area between the pressure surfaces 213 and 223 is extended along lengths of the slot 212. In this way, transferred loads are distributed more evenly along the dovetail section 221 and stress concentrations at the ends of the dovetail section 221 are reduced.

With reference to FIG. 8, a method of assembling an aerodynamic element assembly of a gas turbine engine as described above is provided and includes determining an extent of stress concentrations between pressure surfaces of a dovetail section of an aerodynamic element and pressure surfaces of a slot defined in a hub (801) and at least one of flaring ends of the pressure surfaces of the slot outwardly and shaving ends of the pressure surfaces of the dovetail section inwardly in accordance with a determined extent of the stress concentrations (802).

Benefits of the features described herein are the provision of one of flared fan hub slots and shaved blade dovetails that come into contact during blade dovetail deformation such that load transfer is distributed along extended lengths of the blade dovetails and stress concentrations at the respective ends of the fan hub slots and the blade dovetails are reduced.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aerodynamic element assembly, comprising:
   a hub defining a slot; and
   an aerodynamic element comprising a dovetail section receivable in the slot and an airfoil section configured to aerodynamically interact with fluid to drive hub and aerodynamic element rotations around a rotational axis, the dovetail section being deformable during operational conditions from an initial configuration to a deformed configuration and, with the dovetail section assuming the initial configuration, ends of each side of the slot at opposite ends thereof are flared outwardly and are thereby configured to be spaced apart from corresponding ends of pressure surfaces of the dovetail section.

2. The aerodynamic element according to claim 1, wherein the aerodynamic element comprises a turbine blade and the hub comprises a fan hub.

3. The aerodynamic element according to claim 1, wherein the aerodynamic element comprises a blade and the hub comprises a bladed disk.

4. The aerodynamic element according to claim 1, wherein the slot and the dovetail section are curved.

5. The aerodynamic element according to claim 1, wherein the slot and the dovetail section are straight.

6. The aerodynamic element according to claim 1, wherein a cross-sectional shape of the slot comprises inwardly facing pressure surfaces and a cross-sectional shape of the dovetail section comprises outwardly facing pressure surfaces.

7. The aerodynamic element according to claim 1, wherein the ends of each side of the slot at the opposite ends thereof are flared outwardly by about 0.005 inches.

8. The aerodynamic element according to claim 1, wherein, with the dovetail section assuming the initial configuration, ends of each side of the dovetail section at opposite ends thereof are shaved inwardly and are thereby configured to be spaced apart from corresponding ends of pressure surfaces of the slot.

9. The aerodynamic element according to claim 8, wherein the ends of each side of the dovetail section at the opposite ends thereof are shaved inwardly by about 0.005 inches.

10. A gas turbine engine, comprising:
    a compressor section in which air is compressed;
    a combustor section in which compressed air is mixed with fuel and combusted to produce a working fluid; and
    a turbine section in which the working fluid is expanded, wherein at least one of the compressor section and the turbine section comprises an aerodynamic element assembly, comprising:
    a hub defining a slot; and
    an aerodynamic element comprising a dovetail section receivable in the slot and an airfoil section configured to aerodynamically interact with fluid to drive hub and aerodynamic element rotations around a rotational axis, the dovetail section being deformable during operational conditions from an initial configuration to a deformed configuration and, with the dovetail section assuming the initial configuration, ends of each side of the slot at opposite ends thereof are flared outwardly and are thereby configured to be spaced apart from corresponding ends of pressure surfaces of the dovetail section.

11. The gas turbine engine according to claim 10, wherein the aerodynamic element comprises a turbine blade and the hub comprises a fan hub of the turbine section.

12. The gas turbine engine according to claim 10, wherein the aerodynamic element comprises a blade and the hub comprises a bladed disk of the compressor section.

13. The gas turbine engine according to claim 10, wherein the slot and the dovetail section are curved or straight.

14. The gas turbine engine according to claim 10, wherein a cross-sectional shape of the slot comprises inwardly facing pressure surfaces and a cross-sectional shape of the dovetail section comprises outwardly facing pressure surfaces.

15. The gas turbine engine according to claim 10, wherein the ends of each side of the slot at the opposite ends thereof are flared outwardly by about 0.005 inches.

16. The gas turbine engine according to claim 10, wherein, with the dovetail section assuming the initial configuration, ends of each side of the dovetail section at opposite ends thereof are shaved inwardly and thereby configured to be spaced apart from corresponding ends of pressure surfaces of the slot.

17. The aerodynamic element according to claim 16, wherein the ends of each side of the dovetail section at the opposite ends thereof are shaved inwardly by about 0.005 inches.

\* \* \* \* \*